US008866895B2

(12) United States Patent
Friedlander et al.

(10) Patent No.: US 8,866,895 B2
(45) Date of Patent: Oct. 21, 2014

(54) PASSING CONTROL OF GESTURE-CONTROLLED APPARATUS FROM PERSON TO PERSON

(75) Inventors: Steven Friedlander, San Diego, CA (US); David Thiele, San Diego, CA (US)

(73) Assignee: Sony Corporation, Tokyo (JP)

( * ) Notice: Subject to any disclaimer, the term of this patent is extended or adjusted under 35 U.S.C. 154(b) by 471 days.

(21) Appl. No.: 13/367,606

(22) Filed: Feb. 7, 2012

(65) Prior Publication Data

US 2013/0201314 A1    Aug. 8, 2013

(51) Int. Cl.
*H04N 7/18* (2006.01)
*G06F 3/01* (2006.01)
*H04N 21/422* (2011.01)

(52) U.S. Cl.
CPC .......... *G06F 3/017* (2013.01); *H04N 21/42224* (2013.01)
USPC .......................................................... 348/77

(58) Field of Classification Search
CPC ............. G06F 3/017; H04N 21/42204; H04N 21/42224; H04N 21/4223; H04N 5/232
See application file for complete search history.

(56) References Cited

U.S. PATENT DOCUMENTS

| | | |
|---|---|---|
| 2009/0315740 A1 | 12/2009 | Hildreth et al. |
| 2010/0199229 A1 | 8/2010 | Kipman et al. |
| 2011/0173574 A1 | 7/2011 | Clavin et al. |
| 2012/0268372 A1* | 10/2012 | Park et al. ..................... 345/158 |

OTHER PUBLICATIONS

Dick C.A. Bulterman, Pablo Cesar, A.J. Jansen, Hendrik Knoche, William Seager: "Enabling Pro-Active User-Centered Recommender System: An Initial Evaluation", Multimedia Workshops, 2007. ISMW'07. Ninth IEEE International Symposium, pp. 195-200, Dec. 10-12, 2007.

Brendan Klare, Anil K. Jain, "Face Recognition Across Time Lapse: On Learning Feature Subspace", International Joint Conference Biometrics, Oct. 2011.

Sabrina Tai-Chen Yeh, Steven Friedlander, David Young, "Next Generation User Interface for Audio Video Display Device Such as TV with Multiple User Input Modes and Hierarchy Thereof", pending U.S. Appl. No. 13/163,997, filed Jun. 20, 2011.

* cited by examiner

*Primary Examiner* — Huy T Nguyen

(74) *Attorney, Agent, or Firm* — John L. Rogitz

(57) ABSTRACT

A television (TV) includes a display and a processor controlling the display and receiving signals representing human gestures. The processor is programmed to respond to gestures from a first viewer to control the display. Also, the processor is programmed to respond to gestures from a second viewer to control the display only responsive to a determination that the first viewer has both looked toward the second viewer, and that the first viewer has confirmed, as a separate act from looking toward the second viewer, a desire to transfer control of the TV to the second viewer.

20 Claims, 4 Drawing Sheets

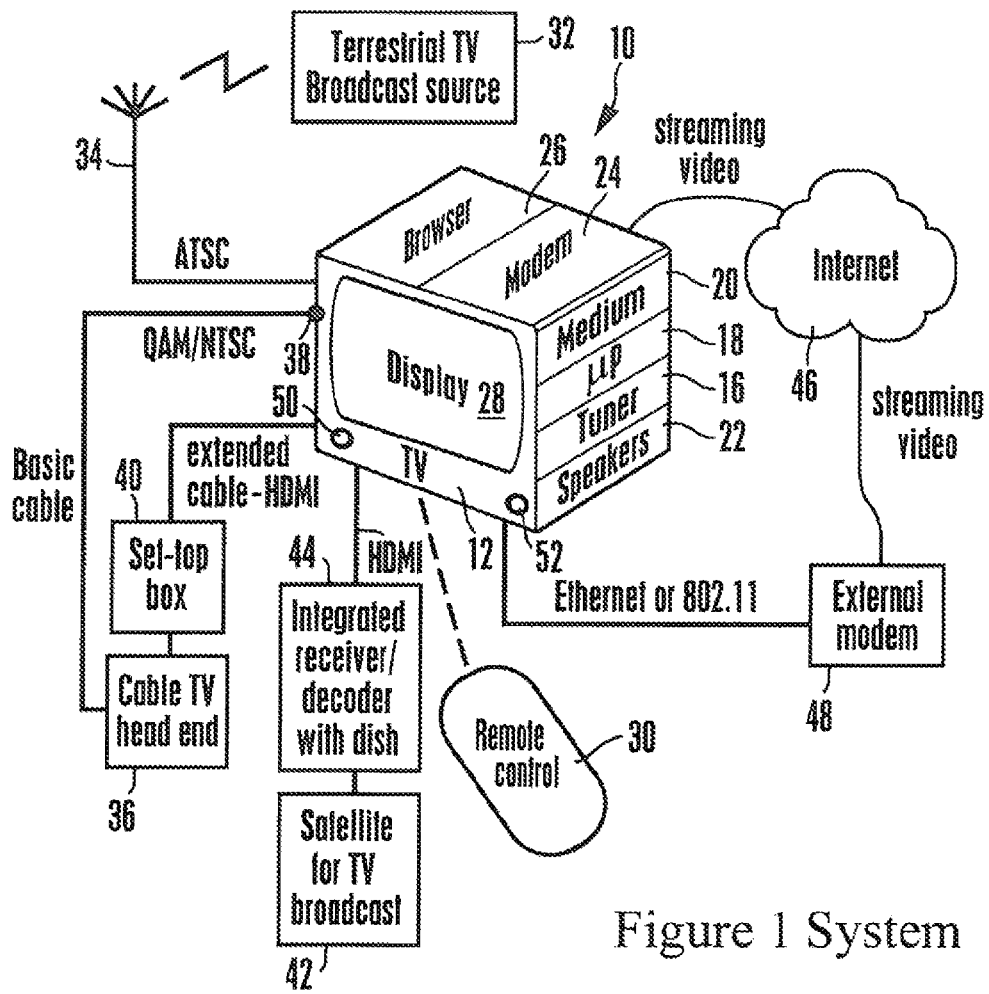
Figure 1 System
Figure 2 example remote control
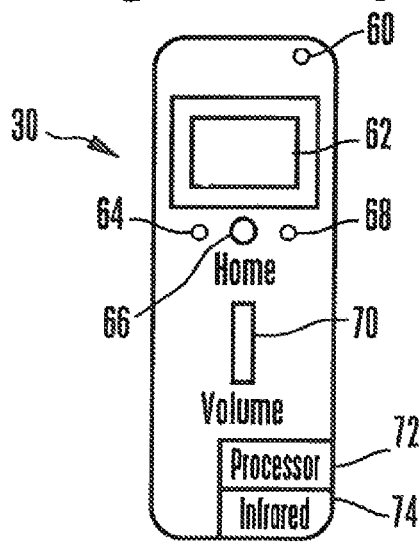

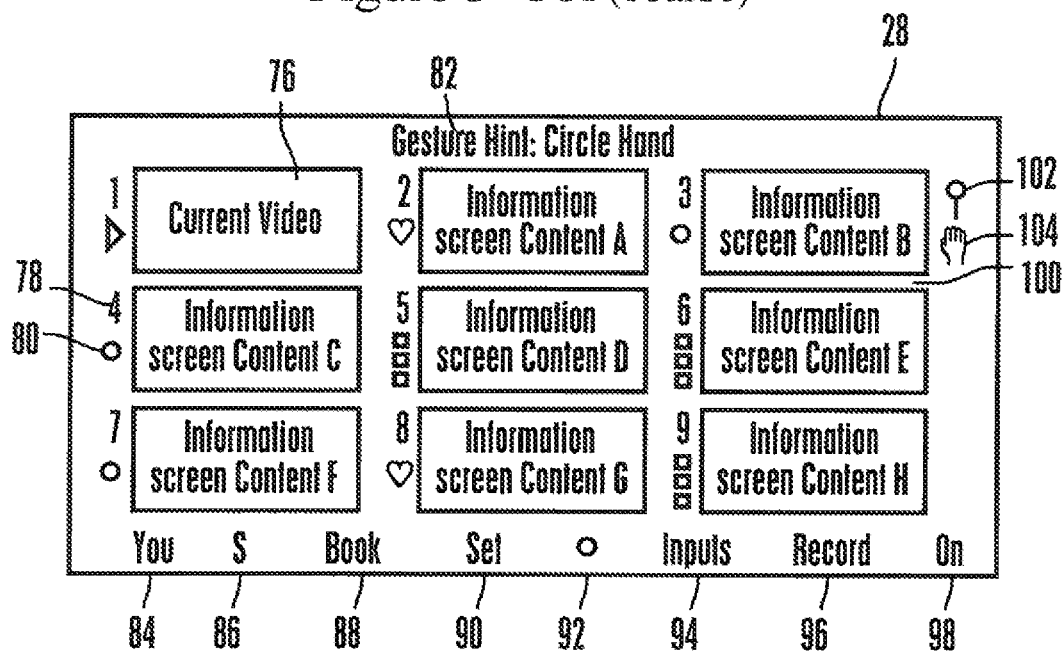
Figure 3 GUI (coarse)
Figure 4 GUI (fine)

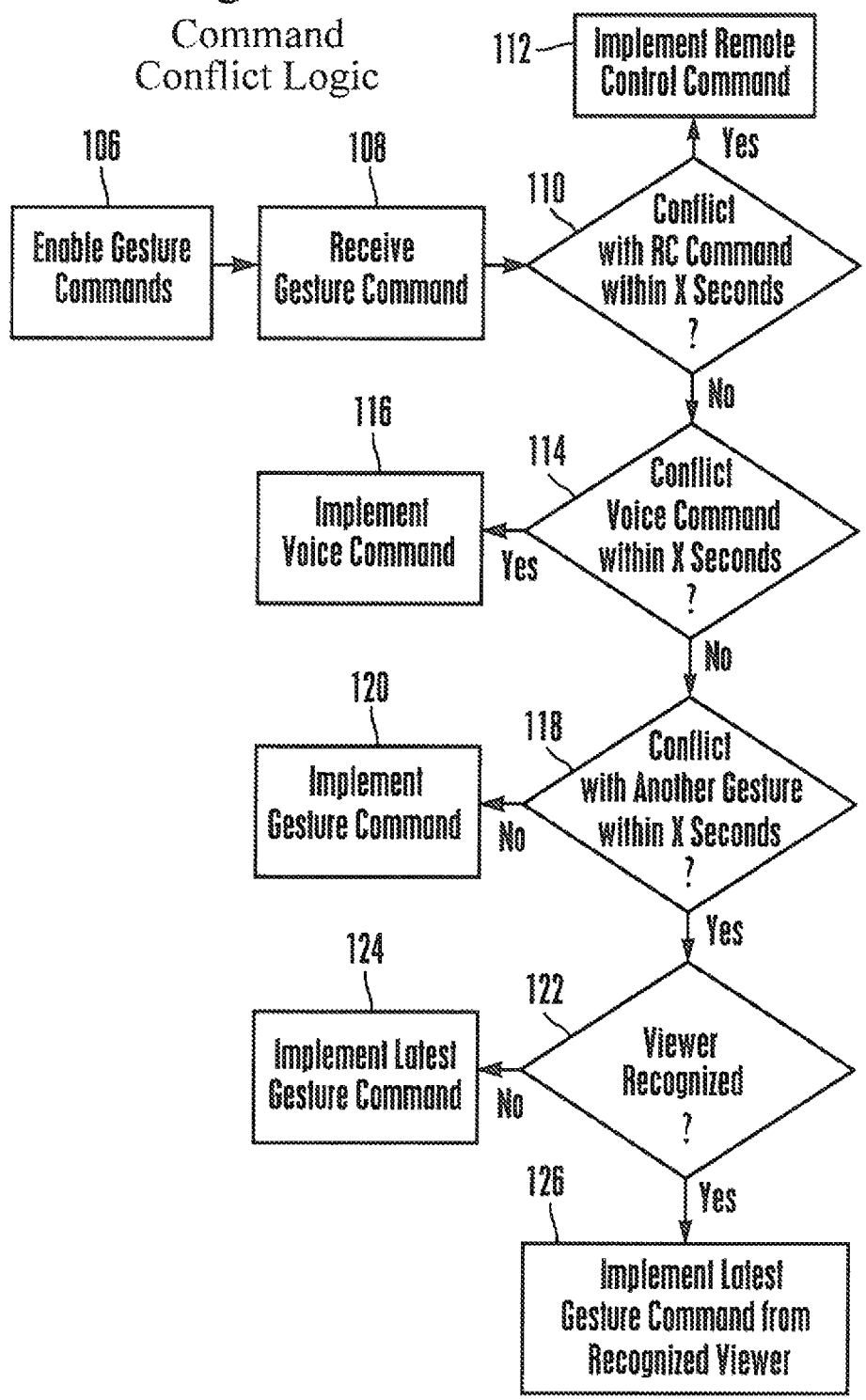

PASSING CONTROL OF GESTURE-CONTROLLED APPARATUS FROM PERSON TO PERSON

FIELD OF THE INVENTION

The present application relates generally to user interfaces (UI) for audio video display devices (AVDD) such as televisions (TVs).

BACKGROUND OF THE INVENTION

Current televisions are controlled mainly by a viewer manipulating a remote control (RC). As understood herein, remote controls can be temporarily misplaced and are not ideal for text entry, and furthermore allow only a single user to control the TV. As also understood herein, a viewer's gestures can be used as an additional command input mode. However, when multiple viewers are watching a TV, multiple people in one room can possibly control a TV with gestures. It is preferred for the viewing experience that only one person be in control at a time to avoid the input in rapid succession of conflicting commands.

SUMMARY OF THE INVENTION

As understood herein, a nifty resolution of this conundrum is to accept gestures from only a single person but allow that person to specifically pass control to another viewer in the room.

Accordingly, an AVDD may include a processor and a video display that may present demanded images under control of the processor. In non-limiting embodiments, the AVDD may also include a computer readable storage medium bearing instructions executable by the processor to receive image signals from a camera that images viewers of the AVDD. Responsive to a determination that a first viewer has initiated a gesture command input mode to control the AVDD, the processor responds to gestures only from the first viewer to control the AVDD. Responsive to a determination that the first viewer has looked toward a second viewer, the processor determines whether the first viewer has made a voice command or body gesture other than looking toward the second person to confirm that the first viewer wishes to pass control of the AVDD to the second person. Thus, responsive to a determination that the first viewer has made a voice command or body gesture other than looking toward the second person confirming a wish to transfer control, the processor transfers gesture control to the second person such that the processor responds to gesture commands only from the second viewer. The body gesture other than looking toward the second viewer may be a pointing gesture of the first viewer toward the second viewer.

In some embodiments the processor determines that the first viewer has looked toward the second viewer by determining that the head of the first viewer has turned toward the second viewer. In other embodiments the processor determines that the first viewer has looked toward the second viewer by determining that the pupils of the first viewer have moved toward the second viewer. Responsive to a determination that the first viewer has looked toward the second viewer, the processor can overlay a message on the display prompting the first viewer to confirm that the first viewer wishes to pass control of the AVDD to the second viewer.

In another aspect, a television (TV) includes a display and a processor controlling the display and receiving signals representing human gestures. The processor is programmed to respond to gestures from a first viewer to control the display. Also, the processor is programmed to respond to gestures from a second viewer to control the display only responsive to a determination that the first viewer has both looked toward the second viewer, and that the first viewer has confirmed, as a separate act from looking toward the second viewer, a desire to transfer control of the TV to the second viewer.

In another aspect, a method includes imaging first and second viewers of an audio video display device (AVDD). The method further includes controlling the AVDD based on gesture commands of the first viewer. The gesture commands are gestures in free space of the first viewer. Further, the method includes controlling the AVDD based on gesture commands of the second viewer only responsive to a predetermined first gesture of the first viewer and a confirmation command from the first viewer.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a plan view of an example remote control (RC) that may be used to control the graphical user interfaces (GUI) described herein, schematically showing the processor and wireless transceiver;

FIG. 3 is a screen shot of a nine panel GUI in a coarse mode suitable for gesture control;

FIG. 4 is a screen shot of a nine panel GUI in a fine mode suitable for RC control;

FIG. 5 is a flow chart showing example command conflict resolution logic; and

DETAILED DESCRIPTION OF THE PREFERRED EMBODIMENT

Figure 6:
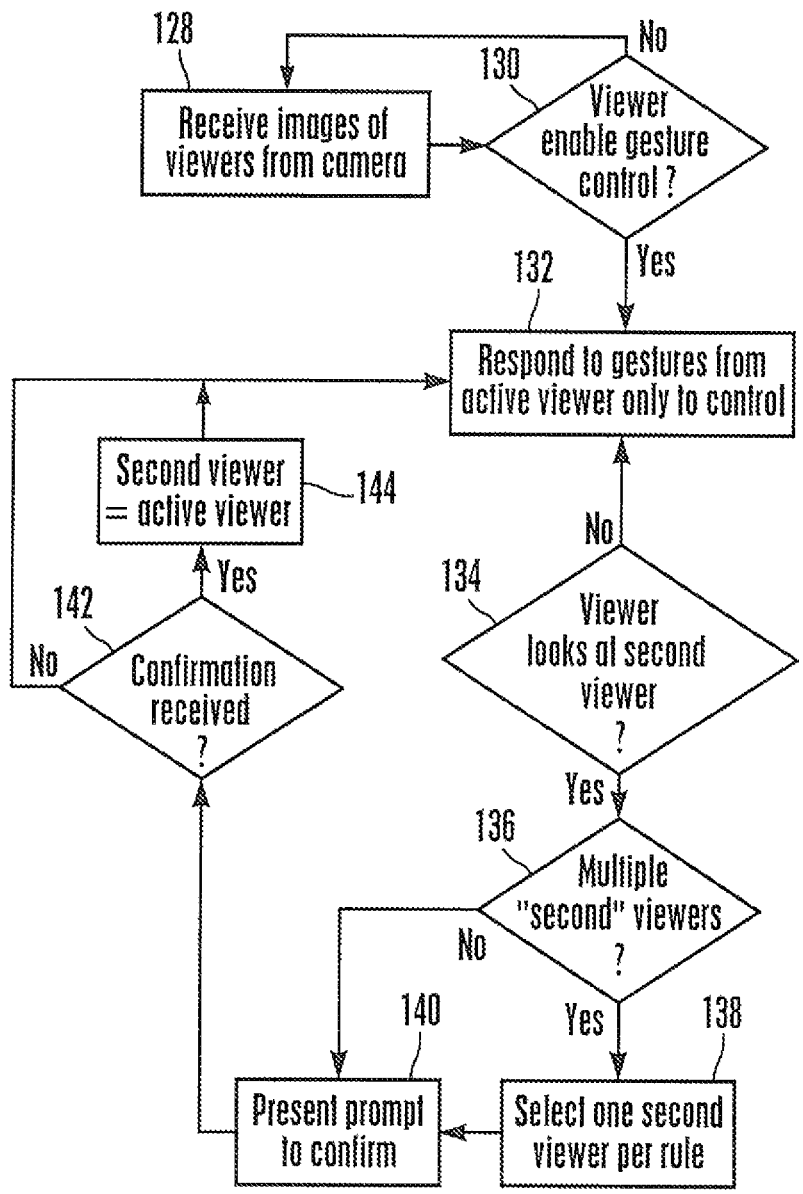
FIG. 6 is a flow chart showing example gesture control pass logic.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. In some implementations, in addition to the below-described gesture input mode, user commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 16 to provide to the processor 16 video images of viewers looking at the display 28. In some non-limiting embodiments, the processor 16 executes facial recognition using the video images received from the camera 50 to identify particular viewers, to identify the direction in which a viewer is looking, and to capture viewer gestures for purposes of command input to the processor 16. The processor 16 also stores images of viewers on the medium 20 in non-limiting embodiments for future determination of whether a viewer is recognized when compared to stored images, or whether a recently received image relates to a new, or non-recognized, viewer. If desired, the processor 16 also creates and/or associates a profile with a user and/or stored images of the user and store the profile on the medium 20. In embodiments which envision, in addition to gesture command input mode, voice command input mode, a microphone 52 may also be provided on the chassis or separate therefrom and can be electrically connected to the processor 16 to provide viewer-generated voice commands to the processor 16.

FIG. 2 shows that in embodiments envisioning use of a remote control to input commands in one command input mode, an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

For illustration purposes, FIGS. 3 and 4 show an example non-limiting home GUI that may be presented on the display 28 of the AVDD 12. In the embodiment shown in FIG. 3, nine information panels arranged as shown in three rows of three panels each present visual content. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV', which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28. When voice or gesture commands are not enabled, the icons 102, 104, respectively, are removed from the display 28.

Non-limiting examples of corresponding RC, voice, and gesture commands that accomplish the same tasks are:

| RC COMMAND | VOICE COMMAND | GESTURE |
|---|---|---|
| Channel up | "Channel up" | upward motion of hand |
| Channel down | "Channel down" | downward motion of hand |
| Volume decrease | "Quieter" | thumb down |
| Volume increase | "louder" | thumb up |

Now in reference to FIG. 5, a non-limiting flow chart showing example command conflict resolution logic is shown. It is to be understood that, in some instances, the AVDD 12 referenced above may receive multiple commands within a given time frame from different methods of input. For example, conflicting commands may be received from the RC 30 and from voice input within "X" seconds of each other. Therefore, present principles recognize that conflicting commands must be resolved.

Thus, beginning at block 106, the logic enables gesture commands to be detected and/or received by the AVDD 12. Then at block 108 the logic receives a gesture command. Moving to decision diamond 110, the logic then determines whether a conflict of commands exists between the gesture command received at block 108 and a RC command also received within X seconds (before or after) of the gesture command.

If the logic determines that there is a conflict of commands at diamond 110, the logic then moves to block 112 where the logic implements the RC command and not the gesture command. However, if the logic determines that there is no conflict of commands between the gesture command and a RC command at diamond 110, the logic instead moves to decision diamond 114. At diamond 114, the logic determines whether there is a conflict between the gesture command received at block 108 and a voice command also received within X seconds of the gesture command.

If the logic determines that there is a conflict of commands at diamond 114, the logic then moves to block 116 where the logic implements the voice command and not the gesture command. However, if the logic determines that there is no conflict of commands between the gesture command and the voice command at diamond 114, the logic instead moves to decision diamond 118. At diamond 118, the logic determines whether there is a conflict between the gesture command received at block 108 and another gesture command received within X seconds of the first gesture command.

If the logic determines that there is no conflict of gesture commands at diamond 118, the logic then moves to block 120 where the logic implements the non-conflicting gesture command. However, if the logic determines that there was a conflict of gesture commands at diamond 118, the logic instead moves to decision diamond 122. At diamond 122, the logic determines whether one or more users providing the gesture commands are recognized in accordance with present principles.

If the logic determines that one or more users are not recognized at diamond 122, the logic then moves to block 124 where the logic implements the latest gesture command received by the AVDD 12. However, if the logic determines that at least one user is recognized at diamond 122, the logic instead moves to block 126. At block 126, the logic implements the latest gesture command from a recognized user. The logic may thus conclude at either block 124 or block 126, depending on the determination made at diamond 122.

Now in reference to FIG. 6, a flow chart showing example gesture command passage of control logic is shown. Beginning at block 128, the logic receives images of viewers watching the AVDD 12 from the camera 50. At decision diamond 130, the processor determines whether a viewer has activated the gesture input mode according to principles set forth above. If not, the logic simply remains at block 128. However, if gesture control is enabled, in the embodiment shown in FIG. 6 the logic proceeds to block 132 to respond to any gestures from one and only one viewer, termed herein the "active" viewer, and does not respond to gestures from other viewers. Initially, the active viewer is the viewer who initiated gesture input mode at decision diamond 130.

As contemplated herein, control may be passed from the active viewer to another viewer who then assumes the role of the active viewer by sensing a predetermined gesture from the active viewer accompanied by a confirmation. In the embodiment shown in FIG. 6, the predetermined gesture is that at decision diamond 134, based on images of the viewers the processor 18 determines that the active viewer has looked toward a second viewer. Facial recognition principles can be used to make this determination by determining that the first viewer has looked toward the second viewer by analyzing the image of the face of the currently active viewer to determine that the head of the first viewer has turned toward the second viewer. This determination may be based on a change in facial aspect from looking straight at the AVDD to looking toward another imaged viewer. In other embodiments the processor determines that the first viewer has looked toward the second viewer by determining that the pupils of the first viewer have moved toward the second viewer.

In any case, a positive determination at decision diamond 134 may, in some embodiments, cause the logic to flow to decision diamond 136 to determine whether multiple "second" viewers are located near each enough to each other as to make it infeasible to positively identify which of the "second" viewers the active viewer is looking toward. If this turns out to be the case, the logic moves to block 138 to select one and preferably only one of the second viewers as the potential new active viewer pending confirmation as discussed below. This selection may be according to one or more selection rules. In one implementation, the second viewer closer to the active viewer than other second viewers is selected. In another implementation, the second viewer closer to the AVDD than other second viewers is selected. In yet another implementation, the second viewer who looks back toward the active viewer after the active viewer has directed his gaze at the second viewer is selected.

From block 138 or from decision diamond 136 if the processor can identify which person in the room constitutes the second viewer toward whom the active viewer has directed his gaze, the logic moves to block 140 if desired to prompt the active viewer to confirm that the active viewer wishes to relinquish gesture control of the VADD to the second viewer. This prompt may be an alpha-numeric message overlaid onto video on the display 28 (or played on the speaker) for a short period of time instructing the active viewer to confirm. For example, the message might be "do you want to relinquish control?" If the second viewer is recognized the message may be more specific: ""do you want to relinquish control to Sam?" Or, the message may specifically instruct the viewer that to confirm a desire to relinquish control, speak a particular command such as "Done" or to make a particular gesture such as pointing to the second person or simply nodding.

If confirmation is received by the processor at decision diamond 142, the logic moves to block 144 to make the active viewer for gesture control purposes the second viewer, looping back to block 132. If confirmation is not received, preferably within a timeout period, the logic loops back to block 132 with the active viewer unchanged.

Present principles may be used as a game where a virtual object gets passed around a room.

While the particular PASSING CONTROL OF GESTURE-CONTROLLED APPARATUS FROM PERSON TO PERSON is herein shown and described in detail, it is to be understood that the subject matter which is encompassed by the present invention is limited only by the claims.

What is claimed is:

1. Audio video display device (AVDD) comprising:
    processor;
    camera imaging viewers of the AVDD and providing image signals to the processor;
    video display presenting demanded images under control of the processor;
    computer readable storage medium bearing instructions executable by the processor to:
        responsive to a determination that a first viewer has initiated a gesture command input mode to control the AVDD, respond to gestures only from the first viewer to control the AVDD;
        responsive to a determination that the first viewer has looked toward a second viewer, determine whether the first viewer has made a voice command or body gesture other than looking toward the second person to confirm that the first viewer wishes to pass control of the AVDD to the second person; and
        responsive to a determination that the first viewer has made a voice command or body gesture other than looking toward the second person confirming a wish to transfer control, transfer gesture control to the second person such that the processor responds to gesture commands only from the second viewer.

2. The AVDD of claim 1, wherein the processor determines that the first viewer has looked toward the second viewer by determining that the head of the first viewer has turned toward the second viewer.

3. The AVDD of claim 1, wherein the processor determines that the first viewer has looked toward the second viewer by determining that the pupils of the first viewer have moved toward the second viewer.

4. The AVDD of claim 1, wherein responsive to a determination that the first viewer has looked toward the second viewer, the processor overlays a message on the display prompting the first viewer to confirm that the first viewer wishes to pass control of the AVDD to the second viewer.

5. The AVDD of claim 1, wherein the processor determines that the first viewer confirms a wish to transfer control to the second viewer by determining that the first viewer has input a predetermined voice command.

6. The AVDD of claim 1, wherein the processor determines that the first viewer confirms a wish to transfer control to the second viewer by determining that the first viewer has made a body gesture other than looking toward the second viewer.

7. The AVDD of claim 6, wherein the body gesture other than looking toward the second viewer is a pointing gesture of the first viewer toward the second viewer.

8. A television (TV) comprising:
    a display; and
    a processor controlling the display and receiving signals representing human gestures, the processor being programmed to respond to gestures from a first viewer to control the display, the processor being programmed to respond to gestures from a second viewer to control the display only responsive to a determination that the first viewer has both looked toward the second viewer, and that the first viewer has confirmed, as a separate act from looking toward the second viewer, a desire to transfer control of the TV to the second viewer.

9. The TV of claim 8, wherein the processor determines that the first viewer has looked toward the second viewer by determining that the head of the first viewer has turned toward the second viewer.

10. The TV of claim 8, wherein the processor determines that the first viewer has looked toward the second viewer by determining that the pupils of the first viewer have moved toward the second viewer.

11. The TV of claim 8, wherein responsive to a determination that the first viewer has looked toward the second viewer, the processor overlays a message on the display prompting the first viewer to confirm that the first viewer wishes to pass control of the TV to the second viewer.

12. The TV of claim 8, wherein the processor determines that the first viewer confirms a desire to transfer control to the second viewer by determining that the first viewer has input a predetermined voice command.

13. The TV of claim 8, wherein the processor determines that the first viewer confirms a desire to transfer control to the second viewer by determining that the first viewer has made a body gesture other than looking toward the second viewer.

14. The TV of claim 13, wherein the body gesture other than looking toward the second viewer is a pointing gesture of the first viewer toward the second viewer.

15. A method, comprising:
imaging first and second viewers of an audio video display device (AVDD);
controlling the AVDD based on gesture commands of the first viewer, the gesture commands being gestures in free space of the first viewer;
controlling the AVDD based on gesture commands of the second viewer only responsive to a predetermined first gesture of the first viewer and a confirmation command from the first viewer.

16. The method of claim 15, wherein the first gesture is the first viewer looking toward the second viewer.

17. The method of claim 16, comprising determining that the first viewer has looked toward the second viewer by determining that the head of the first viewer has turned toward the second viewer.

18. The method of claim 17, comprising determining that the first viewer has looked toward the second viewer by determining that the pupils of the first viewer have moved toward the second viewer.

19. The method of claim 15, wherein responsive to a determination that the first viewer has made the first gesture, the method comprises overlaying a message on the display prompting the first viewer to confirm that the first viewer wishes to pass control of the AVDD to the second viewer.

20. The method of claim 15, comprising responding to gestures of only the first viewer and not the second viewer until the first gesture has been made by the first viewer and the confirmation command has been received from the first viewer, and then responding to gestures of only the second viewer and not the first viewer.

* * * * *